United States Patent Office 3,574,226
Patented Apr. 6, 1971

3,574,226
SUBSTITUTED Δ²-1,2,4-THIADIAZOLIN-5-ONES
Rudi F. W. Ratz, Hamden, and John F. Cronan, Waterbury, Conn., assignors to The Ansul Company
No Drawing. Filed May 19, 1967, Ser. No. 639,648
Int. Cl. C07d 91/60
U.S. Cl. 260—306.7
27 Claims

ABSTRACT OF THE DISCLOSURE

A novel series of substituted Δ²-1,2,4-thiadiazolin-5-ones having the formula

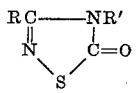

wherein R is haloalkyl, diphenylalkyl, triphenylalkyl, substituted diphenylalkyl, substituted triphenylalkyl, aryloxyalkyl, haloaryloxyalkyl or dialkylaminomethyl and R' is hydrogen, alkyl, alkali metal, ammonium, alkylammonium, hydroxyalkyl or hydroxyalkoxoalkyl has been provided. The thiadiazolin-5-one wherein R' is hydrogen is provided by the reaction of a 5-halo-1,2,4-thiadiazole with an aliphatic acid; this compound is reacted with a variety of materials to provide various other substituted Δ²-1,2,4-thiadiazolin-5-ones. The new compounds are useful as agricultural chemicals. For example, they are effective fungicides, herbicides, algaecides and insecticides.

---

This invention relates to substituted Δ²-1,2,4-thiadiazolin-5-ones having the formula:

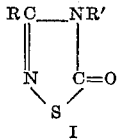

wherein R is haloalkyl, diphenylalkyl, triphenylalkyl, substituted diphenylalkyl, substituted triphenylalkyl, aryloxyalkyl, haloaryloxyalkyl or dialkylaminomethyl and R' is hydrogen, alkyl, alkali metal, ammonium, alkylammonium, hydroxyalkyl or hydroxyalkoxoalkyl.

It has been found that the substituted Δ²-1,2,4-thiadiazolin-5-ones (I) wherein R' is hydrogen are provided by the reaction of a 3-substituted-5-halo-1,2,4-thiadiazole with an aliphatic acid in accordance with the following equation where R is as previously described and X is fluorine, chlorine or bromine.

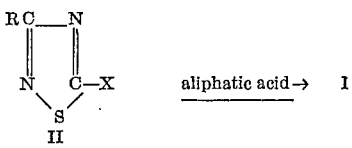 aliphatic acid→ I

The 3-substituted-5-halo-1,2,4-thiadiazoles (II) employed in the preparation of the substituted-4-hydrogen-Δ²-1,2,4-thiadiazolin-5-ones of this invention are readily provided by the reaction of amidine salts with perhalomethylmercaptans in the presence of base as described by J. Goerdeler et al. in Ber. 90, 182 (1957).

While any 3-substituted-5-halo-1,2,4-thiadiazole having the Formula II can be employed in preparing the compounds of this invention, preferred embodiments utilize those thiadiazoles wherein R is haloalkyl, and preferably chloroalkyl, having 1 to 3 carbon atoms, diphenyl- and triphenylalkyl having 1 to 3 aliphatic carbon atoms, phenoxymethyl and halophenoxymethyl. Exemplificative of these thiadiazoles (II) are:
3-monochloromethyl-5-chloro-1,2,4-thiadiazole;
3-dichloromethyl-5-chloro-1,2,4-thiadiazole;
3-trichloromethyl-5-chloro-1,2,4-thiadiazole;
3-(β-chloroethyl)-5-chloro-1,2,4-thiadiazole;
3-(α,β-dichloropropyl)-5-chloro-1,2,4-thiadiazole;
3-monofluoromethyl-5-chloro-1,2,4-thiadiazole;
3-iodomethyl-5-chloro-1,2,4-thiadiazole;
3-(γ-iodopropyl)-5-chloro-1,2,4-thiadiazole;
3-(β-iodoethyl)-5-chloro-1,2,4-thiadiazole;
3-trifluoromethyl-5-chloro-1,2,4-thiadiazole;
3-pentafluoroethyl-5-chloro-1,2,4-thiadiazole;
3-heptafluoropropyl-5-chloro-1,2,4-thiadiazole;
3-monofluoro-monochloromethyl-5-chloro-1,2,4-thiadiazole;
3-(α-fluorobromo-β-difluorobromoethyl)-5-chloro-1,2,4-thiadiazole;
3-(α,α-dichloro-β-difluorochloroethyl)-5-chloro-1,2,4-thiadiazole;
3-(α-fluorobromo-β-difluorobromoethyl)-5-chloro-1,2,4-thiadiazole;
3-(2',2''-dichlorophenylmethyl)-5-chloro-1,2,4-thiadiazole;
3-diphenylmethyl-5-chloro-1,2,4-thiadiazole;
3-triphenylmethyl-5-chloro-1,2,4-thiadiazole;
3-(α,β-diphenylethyl)-5-chloro-1,2,4-thiadiazole;
3-(α,β-diphenylpropyl)-5-chloro-1,2,4-thiadiazole;
3-(β,γ-diphenylpropyl)-5-chloro-1,2,4-thiadiazole;
3-(β,β-diphenylethyl)-5-chloro-1,2,4-thiadiazole;
3-(α,β-dichloro-α,β-diphenylethyl)-5-chloro-1,2,4-thiadiazole;
3-(β,γ-diphenylpropyl)-5-chloro-1,2,4-thiadiazole;
3-(α,α-diphenylpropyl)-5-chloro-1,2,4-thiadiazole;
3-phenoxymethyl-5-chloro-1,2,4-thiadiazole;
3-(p-chlorophenoxymethyl)-5-chloro-1,2,4-thiadiazole;
3-(2',4'-dichlorophenoxymethyl)-5-chloro-1,2,4-thiadiazole;
3-(2',4',5'-tribromophenoxymethyl)-5-chloro-1,2,4-thiadiazole and
3-(2'-chloro-4'-fluorophenoxymethyl)-5-chloro-1,2,4-thiadiazole.

Any lower aliphatic acid, i.e. 1 to 5 carbon atoms, may be employed in the preparation of the hydrogen-substituted Δ²-1,2,4-thiadiazolin-5-ones (I) in accordance with the above equation. Thus, for example, formic glacial acetic, propionic, butyric or valeric acid can be suitably employed.

The reaction is conveniently carried out at a temperature in the range from about 100° C. to about 187° C. and preferably at the reflux temperature of the particular acid employed in the reaction.

While the reaction proceeds satisfactorily in the absence of solvents, high boiling diluents can be employed if desired. Suitable diluents include the aromatic hydrocarbons, e.g., toluene, xylene and the like. The desired hydrogen-substituted compounds I are obtained in high yield and excellent purity and are readily isolated by conventional techniques such as evaporation, crystallization, distillation and the like.

These substituted - 4 - hydrogen - Δ² - 1,2,4 - thiadiazolin-5-ones (I) are then employed in the preparation of a wide variety of other 4-substituted Δ²-1,2,4-thiadiazolin-5-ones having the Formula I. Thus, according to one embodiment, reaction of the hydrogen-substituted compound I with an alkylating agent in accordance with the following equation provides the compounds I wherein R' is alkyl.

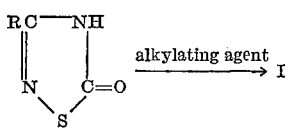

Any of the widely known alkylating agents can be employed in the above-described reaction. Illustrative alkylating agents include the diazoalkanes, i.e. diazoethane, diazomethane, etc.; the alkyl halides, i.e. methyl iodide, ethyl bromide, etc.; the dialkyl sulfates, i.e. dimethyl sulfate, diethyl sulfate, dipropyl sulfate, etc.; and the alkyl p-toluenesulfonates, i.e. methyl p-toluenesulfonate, etc. While any of the above alkylating agents can be employed, preferred embodiments utilize those which provide compounds I where R is alkyl having 1 to 3 carbon atoms.

The alkylation reaction is conveniently carried out in the presence of an inert diluent such as ether and proceeds satisfactorily at temperatures in the range of from about 0° C. to 25° C. The desired 3-substituted-4-alkyl-$\Delta^2$-1,2,4-thiadiazolin-5-ones (I) are obtained in high yield and excellent purity and are readily isolated by conventional techniques such as evaporation, crystallization, distillation and the like.

In another embodiment of this invention, the substituted - 4 - hydrogen - $\Delta^2$ - 1,2,4 - thiadiazolin - 5 - one is reacted with an alkylene oxide alkylating agent to provide compounds having the Formula I wherein R' is hydroxyalkyl and hydroxyalkoxoalkyl. Any alkylene oxide can be employed in this reaction, but preferred embodiments employ the lower alkylene oxides such as ethylene oxide, propylene oxide, butylene oxide and the like. Reaction occurs at temperatures of about 0° C. and about 100° C., and a mixture of products is obtained which is conveniently separated by conventional methods as well as techniques such as preparative gas chromatography.

A wide variey of $\Delta^2$-1,2,4-thiadiazolin-5-one salts falling within the Formula I can also be provided according to this invention. Thus, for example, reaction of the previously described substituted-4-hydrogen-$\Delta^2$-1,2,4-thiadiazolin-5-one with ammonia or ammonium hydroxide provides the corresponding ammonium salt, while reaction with an alkali metal or an alkali metal hydroxide provides the alkali metal salt. Any of the alkali metals and alkali metal hydroxides can be employed in preparing the alkali metal salts. Illustrative of the suitable reactants are sodium, potassium, lithium, cesium, sodium hydroxide, potassium hydroxide, lithium hydroxide and the like.

The preparation of these salts is preferably carried out at temperatures in the range of about 0° C. to about 80° C. Reaction with gaseous ammonia is preferably carried out in the presence of an inert diluent, e.g. the aromatic hydrocarbons such as benzene, toluene, etc., ethers such as diethylether and the like. The reaction with an alkali metal is preferably carried out in the presence of an aliphatic alcohol such as methanol, ethanol, etc. while the alkali metal hydroxides are conveniently employed in aqueous reaction media. The resulting ammonium and alkali metal $\Delta^2$-1,2,4-thiadiazolin-5-one salts are conveniently isolated by any of the previously described techniques.

The 3 - substituted - $\Delta^2$ - 1,2,4 - thiadiazolin - 5 - one alkylammonium salts (I) are provided by reaction of the previously-described substituted - 4 - hydrogen - $\Delta^2$ - 1,2,4-thiadiazolin-5-ones with an amine in accordance with the following equation wherein R and R' are as previously described.

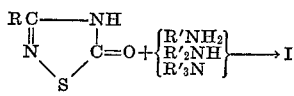

While any primary, secondary or tertiary amine represented by the above equation can be employed, preferred embodiments utilize those amines wherein each R' is an independently selected alkyl moiety having 1 to 4 carbon atoms. Exemplificative amines include methyl amine, ethyl amine, dimethyl amine, propyl amine, isopropyl amine, butyl amine, diethyl amine, trimethyl amine, ethyldimethyl amine, tripropyl amine, tributyl amine and the like. The reaction may be carried out in the presence of water or an inert diluent such as ether, and is preferably carried out at temperatures between about 0° C. and 80° C. The previously described techniques are employed to isolate the desired product.

Surprisingly, it has been found that where R is monochloroalkyl in the previous equation, substitution at the 4 position does not occur. Instead, the chloroalkyl group is dechlorinated to provide a compound having the Formula I wherein R is diloweralkylaminomethyl and R' is hydrogen. This compound is then further reacted to provide other 4-substituted compounds having the Formula I. By the term diloweralkylaminomethyl is meant the moiety

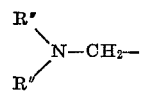

wherein each R" is an independently selected alkyl group having 1–4 carbon atoms.

The compounds I of this invention ahve a wide variety of useful applications. They are particularly valuable agricultural chemicals. Thus, they have exhibited outstanding pesticidal activity as fungicides, herbicides, algaecides and insecticides. Generally, they are mixed with various adjuvants in these applications, and low concentrations of the compound are extremely effective. For example, the algaecidal effectiveness of these compounds has been demonstrated. Thus, at concentrations of 10 p.p.m. in aqueous solutions, the ammonium salt of 3-trichloromethyl - $\Delta^2$ - 1,2,4 - thiadiazolin - 5 - one, the dimethylammonium salt of 3 - trichloromethyl-$\Delta^2$-1,2,4-thiadiazolin - 5 - one, 4 - (2-hydroxy propyl)-3-trichloromethyl - $\Delta^2$ - 1,2,4-thiadiazolin-5-one and 3-(p-chlorophenoxy methyl) - $\Delta^2$ - 1,2,4-thiadiazolin-5-one were all 100 percent effective in inhibiting duckweed. The first three compounds were also 100 percent effective in inhibiting the algae Chlorella, Scenedesmus, Phormidium and Oscillatonia; the last named compound was 85 percent effective in this application.

The compounds of this invention are also effective soil fungicides against a wide variety of palnt pathogenic fungi. For example, 100 p.p.m. of a dust containing 10 percent by weight of 3-trichloromethyl-4-ethyl-$\Delta^2$-1,2,4-thiadiazolin-5-one was 90 percent effective in inhibiting germination of *Rhizoctonia solani* spores, a soil-borne fungus harmful to cotton, vegetables, potatoes, turf, grass, etc.

The nematocidal effectiveness of these compounds is illustrated by the 100 percent inhibition of the root knot nematode by incorporation in the soil at the rate of 20 lbs. per acre of 3-trichloromethyl-4-methyl-$\Delta^2$-1,2,4-thiadiazolin-5-one.

Furthermore, these compounds are valuable insecticides. Thus, for example, the sodium salt of 3-diphenylmethyl-$\Delta^2$-1,2,4-thiadiazolin-5-one was effective in killing the boll weevil, which is extremely harmful to cotton crops.

The following examples serve to illustrate the preparation of various substituted-$\Delta^2$-1,2,4-thiadiazolin-5-ones in accordance with the practice of this invention.

EXAMPLE 1

3 - diphenylmethyl - 5 - chloro - 1,2,4 -thiadazole (101.0 g.) was dissolved in 300 ml. of glacial acetic acid and the reaction mixture was refluxed for a period of 15 hours. After cooling, rotary evaporation provided 91.5 g. of crude crystalline material. Recrystallization from carbon tetrachloride provided 85 g. of colorless, shiny crystals, M.P. 170° C. The following analytical data revealed that 3-diphenylmethyl - $\Delta^2$ - 1,2,4 - thiadiazolin - 5 - one had been obtained in 96.9 percent yield.

Analysis.—Calcd. for $C_{15}H_{12}N_2OS$ (percent): C, 67.12; H, 4.51; N, 10.44; S, 11.95. Found (percent: C, 66.69; H, 4.52; N, 10.73; S, 11.96.

EXAMPLE 2

Following the procedure of Example 1, a solution of 3 - (p-chlorophenoxymethyl) - 5 - chloro - 1,2,4 - thiadiazole in glacial acetic acid was refluxed, cooled and evaporated to provide a crystalline product which was recrystallized from chloroform to provide colorless needles, M.P. 194–195° C. The following analytical data revealed that 3 - (p-chlorophenoxymethyl) - $\Delta^2$ - 1,2,4-thiadiazolin-5-one had been obtained.

Analysis.—Calcd. for $C_9H_7ClN_2O_2$ (percent): C, 44.54; H, 2.91; Cl, 14.61; N, 11.55; S, 13.21. Found (percent): C, 44.75; H, 2.85; Cl, 14.80; N, 11.80; S, 13.16.

EXAMPLE 3

A solution of 3 - trichloromethyl-5-chloro-1,2,4-thiadiazole (284.0 g.) in 1800 ml. of glacial acetic acid was refluxed to provide 170.5 g. of crude crystalline product. Recrystallization from cyclohexane provided 160 g. of colorless crystals, M.P. 151° C. Infrared analysis, mass spectroscopy and the following analytical data revealed that 3 - trichloromethyl-$\Delta^2$ - 1,2,4-thiadiazolin-5-one had been obtained.

Analysis.—Calcd. for $C_3HCl_3N_2SO$ (percent): C, 16.41; H, 0.46; Cl, 48.46; N, 12.77; S, 14.61. Found (percent: C, 16.68; H, 0.62; Cl, 48.40; N, 12.99; S, 14.76.

A ten gram portion of the 3-trichloromethyl-$\Delta^2$-1,2,4-thiadiazolin-5-one was dissolved in 100 ml. of ether and the resulting solution was added dropwise to a solution of 3.2 g. diazomethane in 160 ml. of ether. A strong evolution of nitrogen commenced instantaneously. After 10 minutes, the addition was completed and the reaction mixture was then allowed to stand at room temperature for 1 hour. Excess diazomethane was removed by a nitrogen stream and the resulting slightly colored ethereal solution was subjected to vacuum evaporation. A crystalline, slightly wet residue in the amount of 11.3 g. was obtained. Recrystallization from methanol provided 8.0 g. of colorless, large, compact crystals, M.P. 104° C. The following analytical data revealed that 3-trichloromethyl-4-methyl-$\Delta^2$ - 1,2,4 - thiadiazolin - 5 - one had been obtained in 76.5 percent yield.

Analysis.—Calcd. for $C_4H_3Cl_3N_2OS$ (percent): C, 20.57; H, 1.29; Cl, 45.55; N, 12.00; S, 13.73. Found (percent): C, 20.66; H, 1.45; Cl, 45.50; N, 11.90; S, 13.55.

EXAMPLE 4

To a solution of excess diazoethane in ether was added dropwise a solution of 3-trichloromethyl-$\Delta^2$-1,2,4-thiadiazolin-5-one (10.0 g.), prepared as described in Example 3, in 100 ml. of ether. The flask was immersed in ice water in order to maintain a reaction temperature of 0° C. The reaction proceeded instantaneously as evidenced by the strong evolution of nitrogen at the beginning of the addition. After 15 minutes, the addition was completed and the reaction mixture was maintained for 25 minutes at room temperature with occasional shaking. Excess diazoethane was removed by a nitrogen stream and the mixture was vacuum distilled to provide a yellow-orange oil (11.2 g.), which was kept for 1 hour at 70° C./12 mm. Hg with rotation. Then a crystalline material, M.P. 47.5–48.5° C., was isolated from the yellow-orange oil by preparative gas chromatography. Separation was effected in an Aerograph Autoprep Unit at 250° C. isothermal temperature using a helium flow of 80 cc./min. and a 20 ft. aluminum column (⅜ in. diameter) containing 20 percent SE30 on Chromosorb 80–100 mesh. The following analytical data revealed that 3-trichloromethyl-4-ethyl-$\Delta^2$-1,2,4-thiadiazolin-5-one had been obtained.

Analysis.—Calcd. for $C_5H_5Cl_3N_2OS$ (percent): C, 24.26; H, 2.04; Cl, 42.97; N, 11.31; S, 12.95. Found (percent): C, 24.59; H, 2.35; Cl, 42.20; N, 11.00; S, 12.88.

Mass spectral analysis of a sample of the product revealed the presence of a molecular ion at m/e 297, corresponding to the molecular weight of 3-trichloromethyl-4-ethyl-$\Delta^2$-1,2,4-thiadiazolin-5-one.

EXAMPLE 5

Ten grams of 3-diphenylmethyl-$\Delta^2$-1,2,4-thiadiazolin-5-one as prepared in Example 1 were slurried in 150 ml. of ether. The slurry was then added to a solution of 3.2 g. of diazomethane in 160 ml. of ether at such a rate as to keep the vigorous nitrogen evolution under control. Upon completion of the addition, a clear yellow solution was obtained which was allowed to stand for 20 minutes at room temperature. Then the excess diazomethane was removed by passing a stream of nitrogen into the reaction vessel. Vacuum distillation of the reaction solution provided 10.3 g. of a solid residue which, upon recrystallization from petroleum ether, provided 6.3 g. of colorless needles, M.P. 113–114° C. The following analytical data revealed that 3-diphenylmethyl-4-methyl-$\Delta^2$-1,2,4-thiadiazolin-5-one had been obtained in 60 percent yield.

Analysis.—Calcd. for $C_{16}H_{14}N_2O$ (percent): C, 68.06; H, 5.00; N, 9.92; S, 11.35. Found (percent): C, 68.22; H, 5.05; N, 9.92; S, 11.34.

EXAMPLE 6

Ten grams of 3-monochloromethyl-5-chloro-1,2,4-thiadiazole were dissolved in 100 ml. of glacial acetic acid. The reaction solution was refluxed for 72 hours and then vacuum distilled to provide an oily residue which crystallized on standing. The crystals were dissolved in carbon tetrachloride, treated with charcoal and filtered to provide 8.5 g. of shiny needles, M.P. 128.5° C. The following analytical data revealed that 3-monochloromethyl-$\Delta^2$-1,2,4-thiadiazolin-5-one had been obtained in 93 percent yield.

Analysis.—Calcd. for $C_3H_3ClN_2OS$ (percent): C, 23.93; H, 1.99; N, 18.61; S, 21.29. Found (percent): C, 23.81; H, 1.98; N, 18.57; S, 21.11.

A solution of 3 g. of the 3-monochloromethyl-$\Delta^2$-1,2,4-thiadiazolin-5-one in 80 ml. of ether was then added at a fast rate to a solution of diazomethane (3.2 g.) in 160 ml. of ether. After the addition was completed, the mixture was allowed to stand for 30 minutes and the excess diazomethane was then removed by a nitrogen stream. Rotary evaporation of the reaction mixture provided 3.2 g. of a clear, colorless oil, B.P. 90° C./0.08 mm. Hg. Gas chromatographic analysis revealed that 3-monochloromethyl-4-methyl-$\Delta^2$-1,2,4-thiadiazolin - 5 - one had been obtained in 80 percent yield. Infrared analysis revealed an absorption peak at 5.09μ corresponding to carbonyl absorption and thereby confirming the above structure. The product was purified by gas-liquid chromatography on an Aerograph 1520 Unit employing a 3 ft. stainless steel column (³⁄₁₆ inch O.D.) containing 6 percent XE 60 silicone gum (nitrite) on Chromosorb, DMCS-treated, 80–100 mesh under the following conditions: isothermal column temperature 175° C.; detector block temperature 230° C.; injection quart temperature 160° C. and helium flow rate 52.6 cc./min.

EXAMPLE 7

A solution of 20.0 g. of 3-dichloromethyl-5-chloro-1,2,4-thiadiazole in 200 ml. of glacial acetic acid was refluxed for 144 hours. After cooling, rotary evaporation of the reaction mixture provided 12.6 g. of brown crystals, which were dissolved in carbon tetrachloride, treated with charcoal and filtered to provide 11.0 g. of needle-like colorless crystals, M.P. 109° C. The following analytical data revealed that 3-dichloromethyl-$\Delta^2$-1,2,4-thiadiazolin-5-one had been obtained in 69.5 percent yield.

Analysis.—Calcd. for $C_3H_2Cl_2N_2SO$ (percent): C, 19.47; H, 1.09; Cl, 38.32; N, 15.14; S, 17.33. Found (percent): C, 19.42; H, 0.97; Cl, 38.80; N, 15.08; S, 17.26.

To an ethereal solution of excess diazomethane (3.2 g. in 160 ml. of ether) was added at a fast rate a solution of 2.9 g. of the 3-dichloromethyl-$\Delta^2$-1,2,4-thiadiazolin-5-one in 80 ml. of ether. After the addition was completed, the mixture was allowed to stand for 30 minutes. Then the excess diazomethane was removed by a nitrogen stream and the mixture evaporated to provide 3.0 g. of clear, colorless oil, B.P. 90° C./0.3 mm. Hg. Gas chromatographic analysis revealed that 3-dichloromethyl-4-methyl-$\Delta^2$-1,2,4-thiadiazolin-5-one had been obtained in 84 percent yield. Infrared analysis of a sample of the product revealed an absorption peak at 5.9µ, corresponding to the absorption peak of the carbonyl group and thereby confirming the structure of the product, which was purified by gas-liquid chromatography following the procedure described in Example 6. The following analytical data further confirmed that 3-dichloromethyl-4-methyl-$\Delta^2$-1,2,4-thiadiazolin-5-one had been obtained.

*Analysis.*—Calcd. for $C_4H_4Cl_2N_2OS$ (percent): C, 24.13; H, 2.02; N, 14.08. Found (percent): C, 24.27; H, 2.03; N, 14.07.

EXAMPLE 8

Dimethylamine gas was passed into a solution of 3-monochloromethyl-$\Delta^2$-1,2,4-thiadiazolin-5-one (5.0 g.), prepared as described in Example 6, in 200 ml. of ether. An exothermic reaction occurred, causing a tacky precipitate to form and settle to the bottom of the reaction vessel. The supernatant ether was decanted and the precipitate was washed several times with fresh portions of ether. Recrystallization from chloroform provided 2.5 g. of colorless compact crystals, M.P. 156–157° C. (dec.). The following analytical data revealed that 3-dimethylaminomethyl-$\Delta^2$-1,2,4-thiadiazolin-5-one had been obtained.

*Analysis.*—Calcd. for $C_5H_9N_3OS$ (percent): C, 37.72; H, 5.70; N, 26.39; S, 20.14. Found (percent): C, 37.42; H, 5.64; N, 26.33; S, 20.16.

EXAMPLE 9

3-trichloromethyl-$\Delta^2$-1,2,4-thiadiazolin-5-one (20.0 g.) as prepared in Example 3 was dissolved in 300 ml. of benzene. The reaction flask was immersed in ice water and a stream of ammonia gas was passed into the thiadiazolin one solution. A white precipitate began to separate from the reaction mixture immediately. After the benzene solution was saturated with ammonia, it was allowed to stand for 25 minutes. Filtration of the reaction mixture provided a solid product which was rinsed with ether and stored overnight in vacuum to provide 21.08 g. of product, M.P. 135° C. (dec.). The following analytical data revealed that the ammonium salt of 3-trichloromethyl-$\Delta^2$-1,2,4-thiadiazolin-5-one had been obtained.

*Analysis.*—Calcd. for $C_2H_4Cl_3N_3OS$ (percent): C, 15.23; H, 1.70; Cl, 44.97; N, 17.77. Found (percent): C, 15.49; H, 1.75; Cl, 44.40; N, 17.29.

EXAMPLE 10

Ammonia gas was passed into a solution of 1.0 g. of 3-dichloromethyl-$\Delta^2$-1,2,4-thiadiazolin-5-one in 50 ml. of ether to provide a crystalline colorless precipitate which was collected by suction filtration. After washing with ether, 1.1 g. of product were obtained, M.P. 136–138° C. (dec.). The following analytical data identified the product as the ammonium salt of 3-dichloromethyl-$\Delta^2$-1,2,4-thiadiazolin-5-one.

*Analysis.*—Calcd. for $C_3H_5Cl_2N_3SO$ (percent): C, 17.83; H, 2.49; N, 20.80. Found (percent): C, 17.99; H, 2.39; N, 21.17.

EXAMPLE 11

Following the procedure of Examples 9 and 10, gaseous ammonia was reacted with 3.0 g. of 3-monochloromethyl-$\Delta^2$-1,2,4-thiadiazolin-5-one in 200 ml. of ether. A white crystalline precipitate formed which was collected by suction filtration. The product was slurried in 25 ml. of fresh ether and refiltered to give 3.40 g. of product, M.P. 129–130° C. (dec.). The following analytical data revealed that the ammonium salt of 3-monochloromethyl-$\Delta^2$-2,2,4-thiadiazolin-5-one had been obtained.

*Analysis.*—Calcd. for $C_3H_6ClN_3SO$ (percent): C, 21.50; H, 3.60; N, 25.07. Found (percent): C, 21.75; H, 3.54; N, 25.32.

EXAMPLE 12

3-diphenylmethyl-$\Delta^2$-1,2,4-thiadiazolin-5-one (10.0 g.) as prepared in Example 1 was dissolved in excess 20 percent aqueous ammonia. The resulting clear solution was allowed to evaporate at room temperature to provide a white, free flowing powder, M.P. 170° C. During the melting point determination, ammonia was given off, revealing that the ammonium salt of 3-diphenylmethyl-$\Delta^2$-1,2,4-thiadiazolin-5-one had been obtained. The finally observed melting point of 170° C. was that of 3-diphenylmethyl-$\Delta^2$-1,2,4-thiadiazolin-5-one.

EXAMPLE 13

A stream of gaseous dimethylamine was passed into a solution of 10.0 g. of 3-trichloromethyl-$\Delta^2$-1,2,4-thiadiazolin-5-one, prepared as described in Example 3, in 80 ml. of anhydrous ether. A solid began to separate immediately from the reaction mixture. When no further separation of solid was observed, the reaction was complete. The reaction mixture was allowed to stand 30 minutes at room temperature, and 11.5 g. of colorless crystals, M.P. 118° C., were then collected on a Buchner funnel. The following analytical data revealed that the dimethylammonium salt of 3-trichloromethyl-$\Delta^2$-1,2,4-thiadiazolin-5-one had been obtained in 100 percent yield.

*Analysis.*—Calcd. for $C_5H_8Cl_3N_3OS$ (percent): C, 22.70; H, 3.05; N, 15.88. Found (percent): C, 22.87; H, 3.31; N, 15.76.

EXAMPLE 14

The amount of 0.5 g. of 3-dichloromethyl-$\Delta^2$-1,2,4-thiadiazolin-5-one was dissolved in 15 ml. of ether. With external ice cooling, this solution was saturated with dimethylamine gas. A clear colorless oil settled at the bottom of the flask. The supernatant ether was removed by decantation and the remaining oil pumped over phosphorus pentoxide. Solidification was effected by addition of a small amount of ether with scratching. The colorless crystal powder obtained was collected on a Buchner funnel, M.P. 68–70° C., and identified by the following analytical data as the dimethylammonium salt of 3-dichloromethyl-$\Delta^2$-1,2,4-thiadiazolin-5-one.

*Analysis.*—Calcd. for $C_5H_9Cl_2N_3SO$ (percent): C, 26.10; H, 3.94; N, 18.26. Found (percent): C, 25.88; H, 3.80; N, 18.17.

EXAMPLE 15

Five grams of 3-diphenylmethyl-$\Delta^2$-1,2,4-thiadiazolin-5-one were dissolved in 25 ml. of concentrated aqueous dimethylamine solution. Rotary evaporation of the resulting clear solution at a maximum bath temperature of 35° C. provided a glassy residue which became powdery and tack-free upon drying in vacuum over phosphorus pentoxide. Determination of a melting point of 68–70° C. with dimethylamine release revealed that the dimethylammonium salt of 3-diphenylmethyl-$\Delta^2$-1,2,4-thiadiazolin-5-one had been obtained in 100 percent yield. The formation of a neutral salt was proved by acidifying an aqueous solution of a sample of the product with the dilute hydrochloric acid to provide the 3-diphenylmethyl-$\Delta^2$-1,2,4-thiadiazolin-5-one starting material, M.P. 170° C.

EXAMPLE 16

A stream of gaseous methylamine was passed into a solution of 5.0 g. of 3-trichloromethyl-$\Delta^2$-1,2,4-thiadiazolin-5-one in 30 ml. of ether. Upon completion of the addition, the reaction mixture was filtered to provide 5.7 g. of a white precipitate, M.P. 120° C. (dec.). The following analytical data revealed that a 100 percent yield of the monomethylammonium salt of 3-trichloromethyl-Δ²-1,2,-4-thiadiazolin-5-one had been obtained.

*Analysis.*—Calcd. for $C_4H_6Cl_3N_3OS$ (percent): C, 19.18; H, 2.41; N, 16.79. Found (percent): C, 19.32; H, 2.33; N, 16.59.

EXAMPLE 17

Into an ethereal solution of 0.5 g. of 3-dichloromethyl-Δ²-1,2,4-thiadiazolin-5-one in 50 ml. of ether was passed with external ice cooling a stream of gaseous monomethylamine. An oily reaction product settled at the bottom. After decantation of the supernatant ethereal layer, the oil was kept in vacuo over night to provide a crystal powder (0.45 g.), M.P. 114° C. (dec.). The following analytical data revealed that the monomethylammonium salt of 3-dichloromethyl-Δ²-1,2,4-thiadiazolin-5-one had been obtained.

*Analysis.*—Calcd. for $C_4H_7Cl_2NSO$ (percent): C, 22.23; H, 3.27; N, 19.45. Found (percent): C, 21.19; H, 3.26; N, 19.89.

EXAMPLE 18

A solution of sodium hydroxide (0.8 g.) in 10 ml. of water was added to a solution of 3-monochloromethyl-Δ²-1,2,4-thiadiazolin-5-one (3.01 g.) in 25 ml. of water. Evaporation to dryness of the reaction mixture by rotary evaporation at 25° C. provided a white solid which was powderized and dried in vacuum over phosphorous pentoxide. A sample of this resulting dry solid was dissolved in water to provide a solution having a pH of 7.0. Acidification of this solution with dilute hydrochloric acid and extraction with ether provided the 3-monochloromethyl-Δ²-1,2,4-thiadiazolin-5-one starting material, M.P. 128.5° C., thereby revealing that the sodium salt thereof had been obtained.

EXAMPLE 19

To a solution of 3-dichloromethyl-Δ²-1,2,4-thiadiazolin-5-one (5.551 g.) in 25 ml. of absolute ethanol was added in one portion a solution of sodium metal (0.6897 g.) in 50 ml. of absolute ethanol. Rotary evaporation of the reaction mixture at a maximum bath temperature of 30° C. provided a white solid residue which was suspended in 50 ml. of ether. Five grams of white crystalline powder were obtained by suction filtration of the ether suspension. A second fraction in the amount of 1.3 grams was obtained by evaporation of the ether diluent. The following analytical data revealed that the sodium salt of 3-dichloromethyl-Δ²-1,2,4-thiadiazolin-5-one, M.P. 140–145° C. (dec.), had been obtained in 100 percent yield.

*Analysis.*—Calcd. for $C_3HCl_2N_2OSNa0.2C_2H_5OH$ (percent): C, 17.79; H, 0.47; Cl, 32.8; Na, 10.60. Found (percent): C, 17.94; H, 1.11; Cl, 32.16; Na, 10.16.

EXAMPLE 20

To a solution of 3-trichloromethyl-Δ²-1,2,4-thiadiazolin-5-one (49.2 g.) in 150 ml. of absolute ethanol was added in one portion a solution of sodium metal (5.15 g.) in 200 ml. of absolute ethanol. Rotary evaporation of the reaction mixture at a bath temperature of 30° C. provided a white solid residue which was suspended in 150 ml. of ether. A white crystalline powder was obtained. After filtration and drying in vacuo at room temperature over phosphorus pentoxide, the product amounted to 44.0 g. An additional quantity of product (10.0 g.) was obtained by careful evaporation of the ethereal filtrate. The following analytical data revealed that the sodium salt of 3-trichloromethyl-Δ²-1,2,4-thiadiazolin - 5 - one (dec.>140° C.), had been obtained in 100 percent yield.

*Analysis.*—Calcd. for $C_3Cl_3N_2SONa0.1C_2H_5OH$ (percent): C, 15.62; H, 0.25. Found (percent): C, 14.77; H, 0.46.

EXAMPLE 21

3-diphenylmethyl-Δ²-1,2,4-thiadiazolin-5-one (11.5 g.) was slurried in 50 ml. of water. To this slurry was added a solution of sodium hydroxide (1.73 g.) in 10 ml. of water. Evaporation of the clear reaction solution gave a solid residue which was dried in vacuum over phosphorus pentoxide to provide 13.6 g. of crystals. Final drying was achieved by azeotroping a suspension of the salt in benzene. The following analytical data revealed that the sodium salt of 3-diphenylmethyl-Δ²-1,2,4-thiadiazolin-5-one, M.P. 244–245° C. (dec.), had been obtained.

*Analysis.*—Calcd. for $C_{15}H_{11}N_2OSNa$ (percent): C, 62.01; H, 3.82; N, 9.65. Found (percent): C, 61.53; H, 3.99; N, 9.64.

EXAMPLE 22

3-trichloromethyl-Δ²-1,2,4-thiadiazolin-5-one (10.8 g.) was suspended in 2.8 g. of propylene oxide in a 50 ml. round bottom flask. The flask was closed and allowed to stand at room temperature for 2 days, thereby allowing a viscous solution to form from the reaction mixture. Upon standing for additional 24 hours, crystals began to separate. An additional amount of propylene oxide (1.4 g.) was added to the reaction mixture and the crystals were brought into solution by vigorous stirring. Again the mixture was allowed to stand for 2 days. During this period, a large amount of compact crystals separated therefrom. Suction filtration, drying and recrystallization from n-hexane provided 6.0 g. of colorless crystals, M.P. 95° C. The following analytical data revealed that 3-trichloromethyl-[4-(2-hydroxypropyl)]-Δ²-1,2,4-thiadiazolin-5-one had been obtained.

*Analysis.*—Calcd. for $C_6H_7Cl_3N_2O_2S$ (percent): C, 25.96; H, 2.54; Cl, 38.32; N, 10.09. Found (percent): C, 26.20; H, 2.32; Cl, 38.40; N, 10.30.

Infrared analysis of a sample of the clear, viscous filtrate showed a hydroxyl absorption peak at 2.9μ and a carbonyl absorption peak at 5.9μ. The chlorine content of 33.5 percent revealed that 3 - trichloromethyl - [4 - (5-hydroxy-2,5-dimethyl-3-oxapentyl)]-Δ²-1,2,4-thiadiazolin-5-one had been obtained.

What is claimed is:

1. A substituted Δ²-1,2,4-thiadiazolin-5-one having the formula:

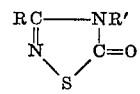

wherein
R is selected from the group consisting of haloalkyl having 1 to 3 carbon atoms, diphenylalkyl having 1 to 3 aliphatic carbon atoms, triphenylalkyl having 1 to 3 aliphatic carbon atoms, phenoxymethyl, halophenoxymethyl and diloweralkylaminomethyl; and
R' is selected from the group consisting of hydrogen, alkyl having 1 to 3 carbon atoms, alkali metal, ammonium, alkylammonium having 1 to 12 carbon atoms;
provided that when R is haloalkyl having 1 to 3 carbon atoms, R' is never hydrogen.

2. The compound of claim 1 wherein R is chloroalkyl having 1 to 3 carbon atoms and R' is alkyl having 1 to 3 carbon atoms.

3. The compound of claim 2 having the name 3-trichloromethyl-4-methyl-Δ²-1,2,4-thiadiazolin-5-one.

4. The compound of claim 2 having the name 3-trichloromethyl-4-ethyl-Δ²-1,2,4-thiadiazolin-5-one.

5. The compound of claim 2 having the name 3-monochloromethyl-4-methyl-Δ²-1,2,4-thiadiazolin-5-one.

6. The compound of claim 2 having the name 3-dichloromethyl-4-methyl-Δ²-1,2,4-thiadiazolin-5-one.

7. The compound of claim 1 wherein R is diphenylalkyl having 1 to 3 aliphatic carbon atoms and R' is hydrogen or alkyl having 1 to 3 carbon atoms.

8. The compound of claim 7 having the name 3-diphenylmethyl-$\Delta^2$-1,2,4-thiadiazolin-5-one.

9. The compound of claim 7 having the name 3-diphenylmethyl-4-methyl-$\Delta^2$-1,2,4-thiadiazolin-5-one.

10. The compound of claim 1 wherein R is chlorophenoxymethyl or diloweralkylaminomethyl and R' is hydrogen.

11. The compound of claim 10 having the name 3-(p-chlorophenoxymethyl)-$\Delta^2$-1,2,4-thiadiazolin-5-one.

12. The compound of claim 10 having the name 3-dimethylaminomethyl-$\Delta^2$-1,2,4-thiadiazolin-5-one.

13. The compound of claim 1 wherein R is chloroalkyl having 1 to 3 carbon atoms and R' is ammonium, alkali metal or alkylammonium having 1 to 12 carbon atoms.

14. The compound of claim 13 having the name 3-trichloromethyl-$\Delta^2$-1,2,4-thiadiazolin - 5 - one, ammonium salt.

15. The compound of claim 13 having the name 3-dichloromethyl-$\Delta^2$-1,2,4-thiadiazolin - 5 - one, ammonium salt.

16. The compound of claim 13 having the name 3-monochloromethyl - $\Delta^2$ - 1,2,4 - thiadiazolin-5-one, ammonium salt.

17. The compound of claim 13 having the name 3-trichloromethyl - $\Delta^2$ - 1,2,4 - thiadiazolin-5-one, dimethylammonium salt.

18. The compound of claim 13 having the name 3-dichloromethyl - $\Delta^2$ - 1,2,4 - thiadiazolin-5-one, dimethylammonium salt.

19. The compound of claim 13 having the name 3-trichloromethyl - $\Delta^2$ - 1,2,4 - thiadiazolin - 5 - one, monomethylammonium salt.

20. The compound of claim 13 having the name 3-dichloromethyl - $\Delta^2$ - 1,2,4 - thiadiazolin - 5 - one, monomethylammonium salt.

21. The compound of claim 13 having the name 3-monochloromethyl - $\Delta^2$ - 1,2,4 - thiadiazolin - 5 - one, sodium salt.

22. The compound of claim 13 having the name 3-dichloromethyl - $\Delta^2$ - 1,2,4 - thiadiazolin - 5 - one, sodium salt.

23. The compound of claim 13 having the name 3-trichloromethyl - $\Delta^2$ - 1,2,4 - thiadiazolin - 5 - one, sodium salt.

24. The compound of claim 1 wherein R is diphenylalkyl having 1 to 3 aliphatic carbon atoms and R' is ammonium, alkali metal or alkylammonium having 1 to 12 carbon atoms.

25. The compound of claim 24 having the name 3-diphenylmethyl - $\Delta^2$ - 1,2,4 - thiadiazolin - 5 - one, ammonium salt.

26. The compound of claim 24 having the name 3-diphenylmethyl - $\Delta^2$ - 1,2,4 - thiadiazolin-5-one, dimethylammonium salt.

27. The compound of claim 24 having the name 3-diphenylmethyl-$\Delta^2$ - 1,2,4 - thiadiazolin-5-one, sodium salt.

References Cited

UNITED STATES PATENTS 3,287,464  11/1966  Narayanan et al. __ 260—306.7

ALTON D. ROLLINS, Primary Examiner

U.S. Cl. X.R.

71—90; 424—270

PO-1050
(5/69)

UNITED STATES PATENT OFFICE
CERTIFICATE OF CORRECTION

Patent No. 3,574,226  Dated April 6, 1971

Inventor(s) Rudi F. W. Ratz and John F. Cronan

It is certified that error appears in the above-identified patent and that said Letters Patent are hereby corrected as shown below:

Column 4, line 25, change "ahve" to --have--.

Column 4, line 46, change "palnt" to --plant--.

Column 5, line 14, change "$C_9H_7ClN_2O_2$" to --$C_9H_7ClN_2O_2S$--.

Column 6, line 24, change "$C_{16}H_{14}N_2O$" to --$C_{16}H_{14}N_2OS$--.

Column 7, line 55, change "$C_2H_4Cl_3N_3OS$" to --$C_3H_4Cl_3N_3OS$--.

Column 8, line 6, change "2,2,4-thiadiazolin-" to --1,2,4-thiadiazolin--.

line 67, change "with the dilute" to --with dilute

Signed and sealed this 11th day of July 1972.

(SEAL)
Attest:

EDWARD M. FLETCHER, JR.
Attesting Officer

ROBERT GOTTSCHALK
Commissioner of Patents